(12) United States Patent
Liebl et al.

(10) Patent No.: US 7,758,104 B2
(45) Date of Patent: Jul. 20, 2010

(54) WINDOW ARRANGEMENT FOR A CONSTRUCTION VEHICLE

(75) Inventors: John Liebl, Atwater, MN (US); Jeff Percival, Linn Creek, MO (US); Mike Vought, Grove City, MN (US); Amardeep Chauhan, Litchfield, MN (US); Anthony Miller, Lynchburg, VA (US)

(73) Assignee: Clark Equipment Company, West Fargo, ND (US)

( * ) Notice: Subject to any disclaimer, the term of this patent is extended or adjusted under 35 U.S.C. 154(b) by 226 days.

(21) Appl. No.: 11/970,143

(22) Filed: Jan. 7, 2008

(65) Prior Publication Data

US 2008/0191514 A1 Aug. 14, 2008

Related U.S. Application Data

(60) Provisional application No. 60/901,426, filed on Feb. 13, 2007, provisional application No. 60/901,509, filed on Feb. 13, 2007.

(51) Int. Cl.
*B60J 1/02* (2006.01)
*F16B 35/00* (2006.01)

(52) U.S. Cl. .............. 296/190.1; 296/190.11; 296/200; 296/146.2; 411/424

(58) Field of Classification Search .......... 296/146.1, 296/147, 148, 146.2, 146.3, 200, 190.01, 296/190.03, 190.1, 190.11; 52/208; 49/141; 16/258, 262; 411/424

See application file for complete search history.

(56) References Cited

U.S. PATENT DOCUMENTS

| 2,576,392 | A | | 11/1951 | Downes |
| 3,851,845 | A | * | 12/1974 | Edwards ............... 244/129.5 |
| 4,050,735 | A | * | 9/1977 | Molnar ................... 296/102 |
| 4,082,343 | A | * | 4/1978 | Hurt et al. ............ 296/190.03 |
| 4,095,640 | A | | 6/1978 | Beckerer, Jr. ............. 160/92 |

(Continued)

FOREIGN PATENT DOCUMENTS

DE 199 21 481 11/2000

(Continued)

OTHER PUBLICATIONS

European Search Report, revised abstract and comments on claims (8 pgs).

*Primary Examiner*—Patricia L Engle
(74) *Attorney, Agent, or Firm*—Westman, Champlin & Kelly, P.A.

(57) ABSTRACT

A construction vehicle door assembly includes a frame member having an inside surface and an outside surface, a window pane is positioned proximate one of the inside surface and outside surface, and a first resilient member substantially vibrationally isolates the frame member and the window pane. A fastener extends through the frame member, window pane and first resilient member to couple the window pane to the frame member. A second resilient member substantially vibrationally isolates the window pane and the fastener. A pair of hinges are coupled to the frame member, a pair of hinge pins are selectively extended into the respective one of the pair of hinges, and a lever is coupled to the pair of hinge pins for moving the pair of hinge pins relative to the pair on hinges upon movement of the lever, to detach the door assembly from the vehicle.

12 Claims, 9 Drawing Sheets

U.S. PATENT DOCUMENTS

| | | | |
|---|---|---|---|
| 4,102,011 A * | 7/1978 | Clack, Jr. | 16/261 |
| 5,315,952 A | 5/1994 | Jackson, Jr. | 114/312 |
| 5,419,088 A | 5/1995 | Raymond et al. | 52/1 |
| 5,560,149 A | 10/1996 | Lafevre | 49/501 |
| 5,642,915 A * | 7/1997 | Ackermann et al. | 296/214 |
| 5,765,325 A | 6/1998 | DeBlock | 52/204.5 |
| 5,778,629 A | 7/1998 | Howes | 52/786.11 |
| 5,937,611 A | 8/1999 | Howes | 52/745.15 |
| 6,101,783 A | 8/2000 | Howes | 52/786.11 |
| 6,189,954 B1 * | 2/2001 | Martin, Jr. | 296/190.08 |
| 6,247,746 B1 | 6/2001 | Brush | 296/190.11 |
| 6,382,711 B2 * | 5/2002 | Martin, Jr. | 296/190.08 |
| 6,427,383 B1 * | 8/2002 | Brooks et al. | 49/141 |
| 6,715,245 B2 | 4/2004 | Lewkowitz | 52/208 |
| 6,883,755 B2 | 4/2005 | Pautis et al. | 244/129.3 |
| 2003/0110703 A1 | 6/2003 | Kobrehel | 49/394 |
| 2007/0245522 A1 * | 10/2007 | Selvaraj | 16/258 |

FOREIGN PATENT DOCUMENTS

| | | |
|---|---|---|
| EP | 1 529 708 | 5/2005 |
| EP | 1 916 131 | 4/2008 |

* cited by examiner

WINDOW ARRANGEMENT FOR A CONSTRUCTION VEHICLE

RELATED APPLICATION DATA

This application claims benefit under 35 U.S.C. Section 119(e) of U.S. Provisional Applications 60/901,426 and 60/901,509, both filed Feb. 13, 2007, both of which are incorporated by reference in their entirety.

BACKGROUND

The present invention relates to a window assembly for a door of a construction vehicle. More specifically, the present invention relates to a window assembly that inhibits breakage of the window due to impact or vibrations caused by operation of the vehicle, but allows an operator to escape the vehicle in case of emergency.

SUMMARY

In one embodiment, the invention provides a door assembly for a construction vehicle. The door assembly includes a frame member that has an inside surface and an outside surface and is releasably coupled to the vehicle. A window pane is positioned proximate one of the inside surface and outside surface. A first resilient member is positioned between the frame member and the window pane, to substantially vibrationally isolate the frame member and the window pane. A fastener extends through the frame member, window pane and first resilient member to couple the window pane to the frame member. A second resilient member is positioned between the window pane and the fastener to substantially vibrationally isolate the window pane and the fastener. A pair of hinges are coupled to the frame member and a pair of hinge pins selectively extend into the respective one of the pair of hinges. A lever is coupled to the pair of hinge pins for moving the pair of hinge pins relative to the pair of hinges upon movement of the lever, to selectively detach the door assembly from the vehicle.

In another embodiment, the invention provides a door assembly having a frame member that defines a window aperture and a frame hole. A gasket is constructed of a resilient material and is adjacent the frame member and substantially surrounds the window aperture. The gasket defines a gasket hole substantially aligned with the frame hole. A windowpane is positioned adjacent the gasket and the windowpane substantially covers the window aperture and defines a window hole substantially aligned with the gasket hole. A washer constructed of a resilient material is adjacent the windowpane. The washer defines a washer hole substantially aligned with the window hole. At least one fastener assembly extends through the substantially aligned frame hole, gasket hole, window hole, and washer hole, and has a first end that defines a first enlarged portion that abuts against the frame member, and a second end opposite the first end. The second end defines a second enlarged portion, and abuts against the washer. A lever is coupled to the frame member, and at least one hinge pin is coupled to the lever for movement in response to movement of the lever.

In another embodiment, the invention provides a method of opening a door of a construction vehicle. The door includes at least one resilient member positioned between a frame member and a window pane, and the door is rotatable with respect to the vehicle about at least one hinge. The method includes rotating a lever positioned on the inside of the vehicle, removing at least one hinge pin from the at least one hinge, pushing the door open, and detaching the door from the vehicle.

In some embodiments, a plurality of fastener assemblies support the windowpane in the absence of a rigid structural element, such as an external frame positioned between the windowpane and the plurality of fastener assemblies.

In other embodiments, the second enlarged portions of the fastener assemblies abut directly against the resilient washers.

In some embodiments, the window holes define counter bore portions extending from the outer surface and the resilient washers are positioned within the counter bores. The second enlarged portions of the fastener assemblies are at least partially disposed within the counter bores.

In some embodiments a stack height of the fastener assembly equals the sum of the thickness of the gasket, distance from the inner surface of the windowpane to the resilient washer, and thickness of the resilient washer. Each fastener assembly includes a shoulder having a diameter larger than the diameter of the frame holes, such that the shoulder abuts against the frame member around the frame hole. Abutment of the shoulder against the frame member fixes the distance between the second enlarged portion and the frame member to be slightly smaller than the stack height of the fastener assembly to slightly preload the gasket and resilient washer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
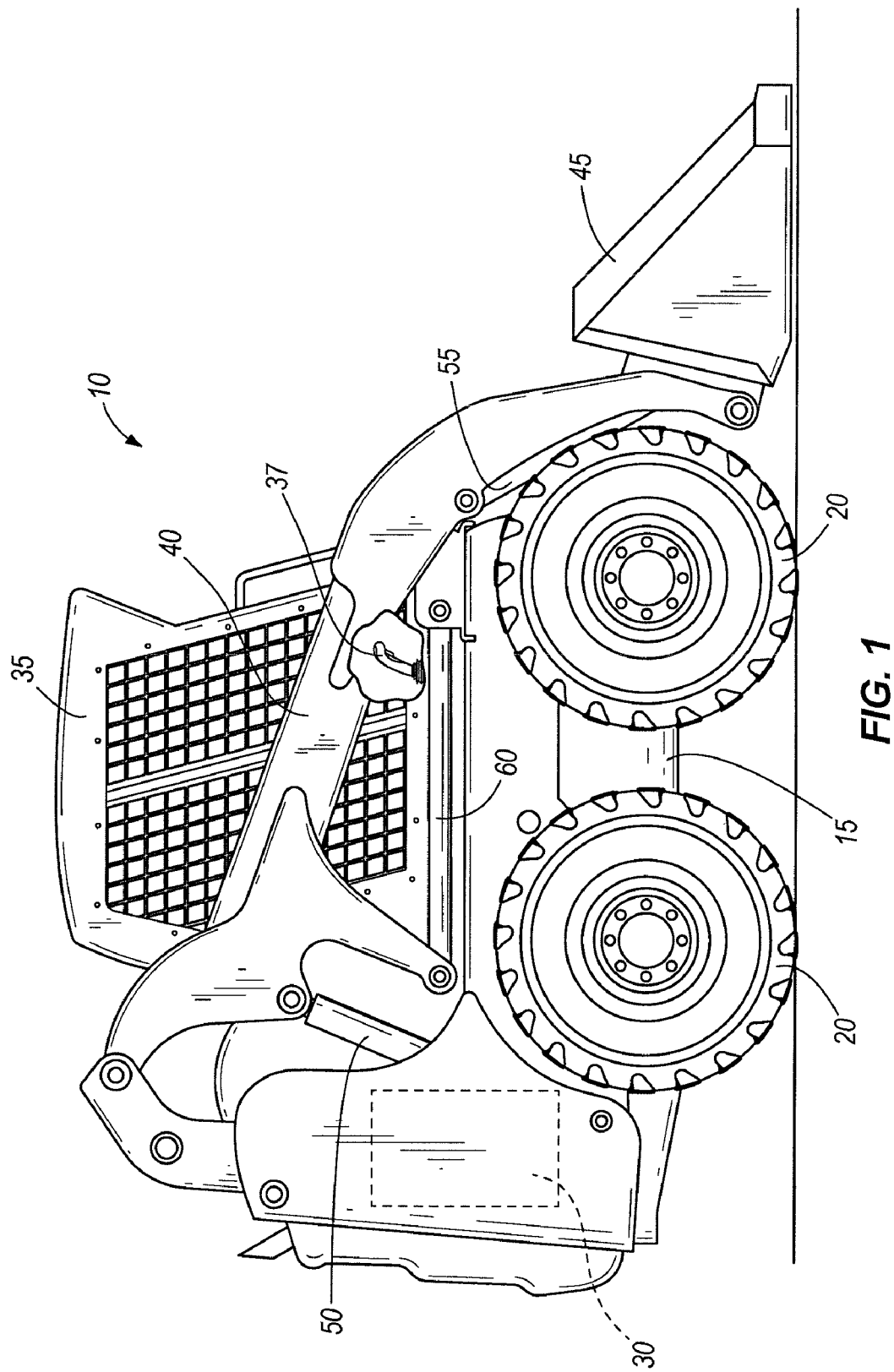
FIG. 1 is a side view of a skid steer loader according to one embodiment of the present invention.
Figure 2:
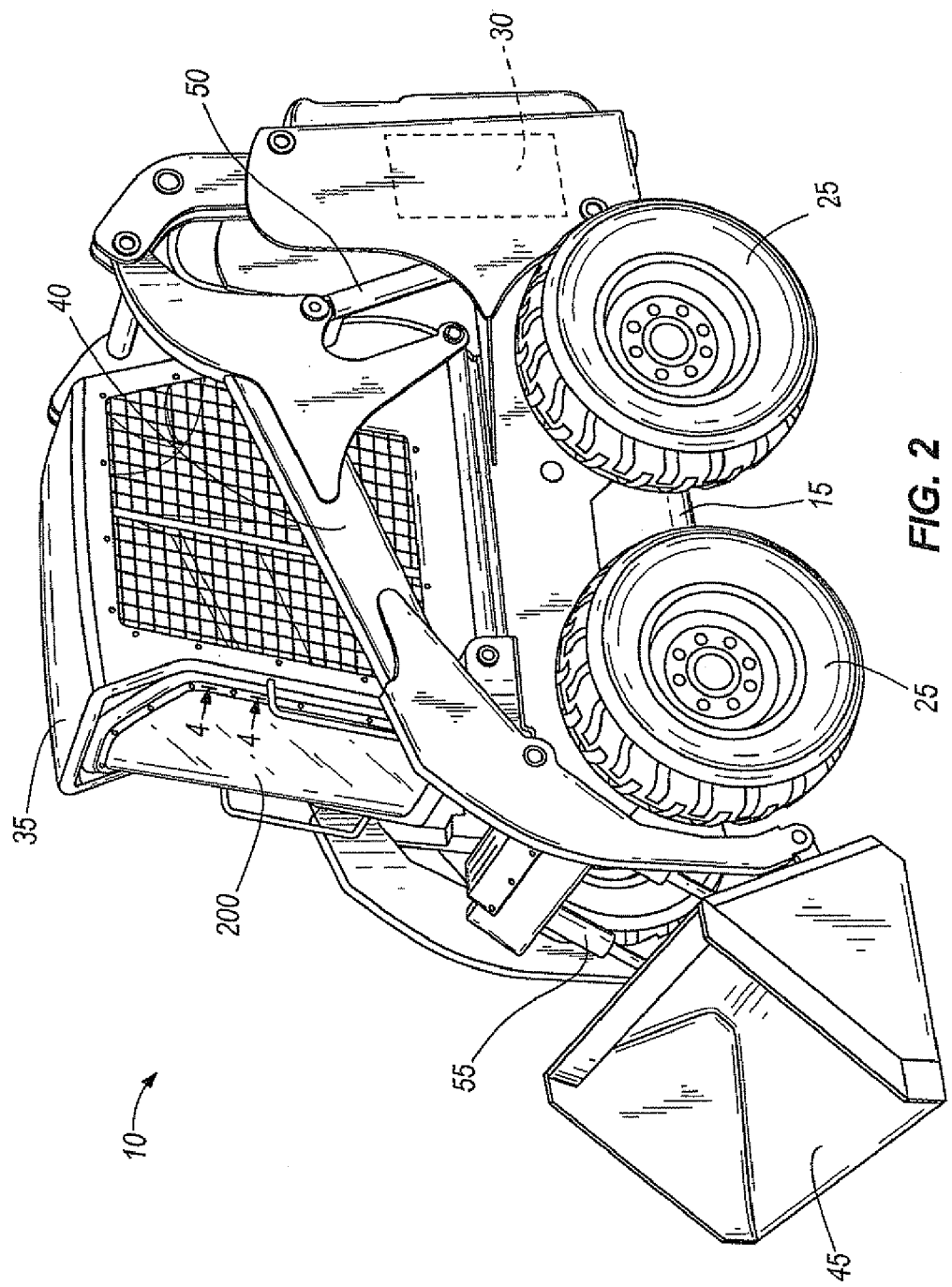
FIG. 2 is a perspective view of the skid steer loader of FIG. 1.

FIGS. 1 and 2 depict a skid steer loader 10 having a frame member 15 supported by two right side wheels 20 and two left side wheels 25, an internal combustion engine 30, an operator compartment 35 that contains an operator control 37, right and left lift arms 40, and a bucket 45 mounted for tilting between the distal ends of the lift arms 40. Although the invention is illustrated embodied in a skid steer loader 10, the invention may be embodied in other construction vehicles and machines, including for example, excavators, track loaders, skid steer loaders, front end loaders, utility vehicles and other similar vehicles and machines. Although the illustrated operator control 37 takes the form of a joystick, in other embodiments, the operator control 37 may include multiple joysticks, foot pedals, and/or steering wheels.

The right side wheels 20 are driven independently of the left side wheels 25. When all four wheels 20, 25 rotate at the same speed, the loader 10 moves forward and backward, depending on the direction of rotation of the wheels 20, 25. The loader 10 turns by rotating the right and left side wheels 20, 25 in the same direction but at different rates, or turns about a substantially zero turn radius by rotating the right and left side wheels 20, 25 in opposite directions.

The lift arms 40 raise (i.e., rotate counterclockwise in FIG. 1) and lower (i.e., rotate clockwise in FIG. 1) with respect to the frame member 15 under the influence of lift cylinders 50 mounted between the frame member 15 and the lift arms 40. The bucket 45 tilts with respect to the arms 40 to curl (i.e., rotate counterclockwise in FIG. 1) and dump (i.e., rotate clockwise in FIG. 1) under the influence of tilt cylinders 55 mounted between the lift arms 40 and the bucket 45. Various auxiliary implements or devices may be substituted for or used in conjunction with the bucket 45. An exemplary, but by no means exhaustive, list of auxiliary implements includes augers, jack hammers, trenchers, grapples, rotary sweepers, stump grinders, saws, concrete mixers, pumps, chippers, snow throwers, rotary cutters, and backhoes.

Figure 3:
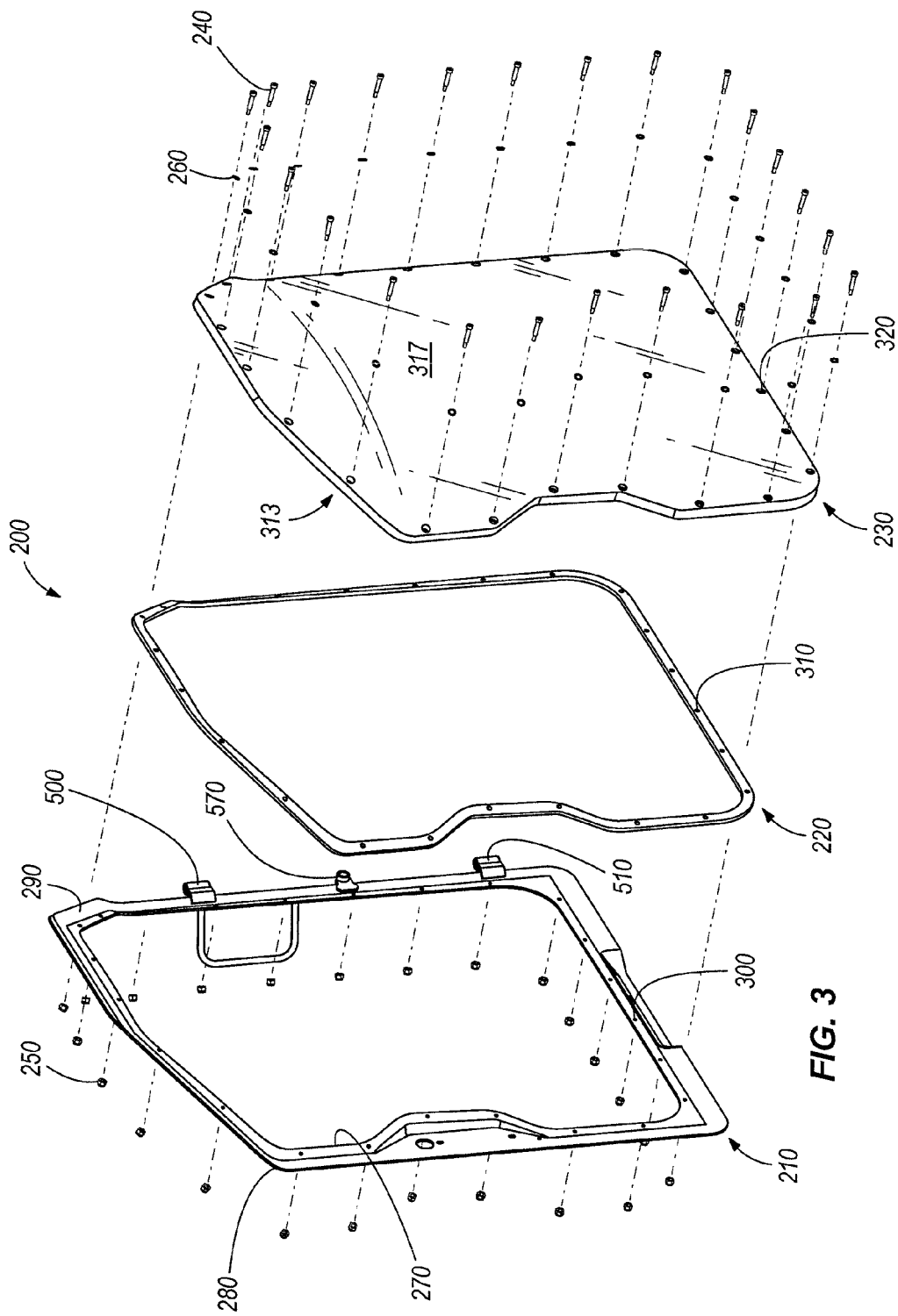
FIG. 3 is an exploded view of a door assembly of the skid steer loader of FIG. 1.

FIG. 3 depicts an exploded view of a door assembly 200 for accessing the operator compartment 35. The door assembly 200 includes a door frame 210, a gasket 220, a windowpane 230, and a plurality of fasteners 240, nuts 250, and resilient washers 260. The door frame 210 defines a window aperture 270 and includes both inside and outside surfaces 280, 290. The door frame 210 is made of steel or any other suitably rigid material. The door frame 210 includes a plurality of frame apertures 300 around a perimeter of the window aperture 270. The gasket 220 substantially follows the shape of the window aperture 270 and is abutted against the outside surface 290 of the door frame 210. In this regard, the outside surface 290 of the door frame 210 may be termed a bearing surface. The gasket 220 is made of resilient, shock absorbing material and includes a plurality of gasket apertures 310. The windowpane 230 substantially follows the shape of the window aperture 270 and is made from a sheet of LEXAN® or other suitable see-through material. In this regard, the windowpane 230 may be transparent, translucent, tinted, or otherwise customized for the desired application. The windowpane 230 has inside and outside surfaces 313, 317. The windowpane 230 substantially covers at least a portion of the window aperture 270, and at least a portion of the inside surface 313 of the windowpane 230 abuts against the gasket 220. Located around a perimeter of the windowpane 230 are a plurality of window holes 320. The fasteners 240 are shoulder bolts in the illustrated embodiment. The nuts 250 are threaded to mate with the fasteners 240. The resilient washers 260 are made of resilient, shock absorbing material.

Figure 4:
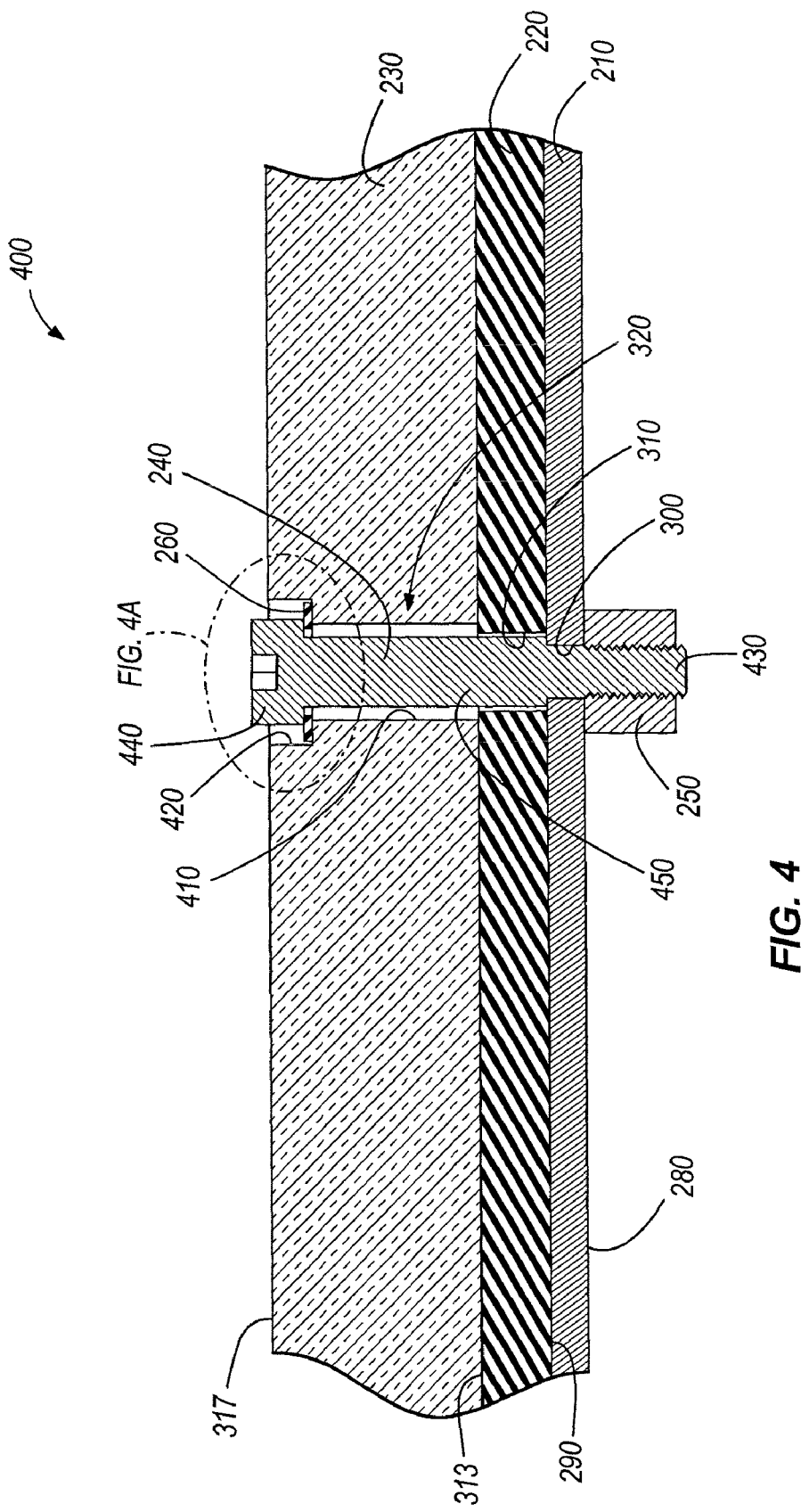
FIG. 4 is a cross-sectional view of a portion of the door assembly of FIG. 1, taken along line 4-4 of FIG. 2.

FIG. 4 is a cross-sectional view of a fastener assembly 400 used in the door assembly 200. Each fastener assembly 400 includes: one fastener 240, one resilient washer 260, and one nut 250 to secure the windowpane 230 and gasket 220 to the door frame 210. The frame holes 300, gasket holes 310, and window holes 320 are substantially aligned to allow for the passage of the fastener 240 therethrough. The window hole 320 has a through bore 410 extending from the inside surface 313 and a larger diameter counter bore 420 extending from the outside surface 317 and communicating with the through bore 410. The fastener 240 has a threaded end 430, a head 440, and a shoulder 450 between the threaded end 430 and head 440. The head 440 has a larger diameter than the shoulder 450, and the shoulder 450 has a larger diameter than the threaded end 430. The length of the shoulder 450 on the fastener 240 is slightly less than the combined uncompressed stack height of the resilient washer 260, the length of the through bore portion 410 of the window hole 320, and the gasket 220, to allow for slight compression or preloading of the resilient gasket 220 and washer 260 upon assembly.

As shown in FIG. 4, the threaded end 430 of the fastener 240 passes through the frame hole 300. The nut 250 is threaded onto the threaded end 430 of the fastener 240 and tightened so the nut 250 rests on the inside surface 280 of the door frame 210 and the end of the shoulder 450 rests against the outside surface 290 of the door frame 210. The head 440 and nut 250 may be termed enlarged portions of the fastener assembly 400. The fastener assembly 400 can be inverted such that the head 440 is against the door frame 210 and the nut 250 is against the resilient washer 260. If the fastener assembly 400 is inverted, a combination of a standard bolt and a sleeve having outer dimensions similar to that of the shoulder 450 of the fastener 240 may be used in place of the fastener 240.

Figure 4A:
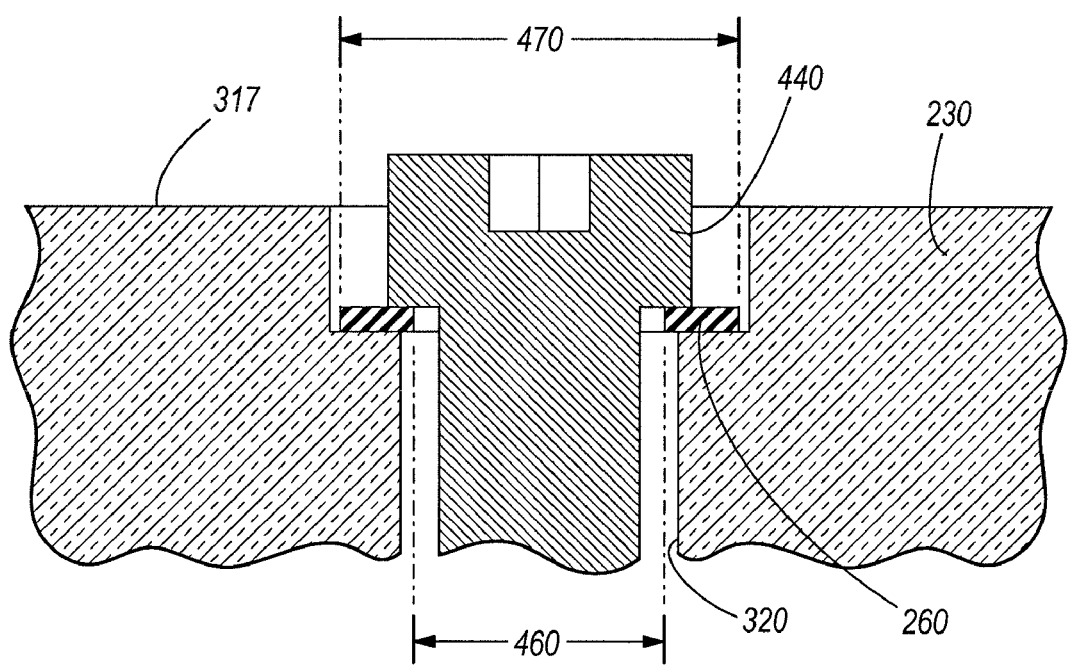
FIG. 4A is a close-up section view of a portion of the door assembly of FIG. 1, taken from FIG. 4.

FIG. 4A shows the resilient washer 260 having an inner and outer diameter 460, 470. The resilient washer 260 separates the head 440 from the bottom of the counter bore portion 420 of the window hole 320. The outer diameter 460 of the resilient washer 260 is slightly smaller than the diameter of the window hole counter bore 420. The inner diameter 460 of the resilient washer 260 is slightly larger than the diameter of the shoulder 450, and smaller than the diameter of the head 440. In this regard, the inner diameter 460 of the resilient washer 260 may be termed a washer hole. When seated, the head 440 of the fastener 240 rests upon the resilient washer 260 and is partially recessed with respect to the outer surface 317 of the windowpane 230 in the window hole counter bore 420. The shoulder 450 of the fastener 240 passes through the inner diameter 460 of the resilient washer 260, through the through bore 410, and through the gasket hole 310.

The windowpane 230 can move along the axis of the fastener 240 upon impact. The gasket 220 and the resilient washer 260 absorb forces causing deflection of the windowpane 230 upon impact. The gasket 220 and the resilient washer 260 also substantially vibrationally isolate the windowpane 230 from the frame member 210. Further, the fastener 240 resists movement of the windowpane 230 in directions parallel to the fastener axis.

Figure 5:
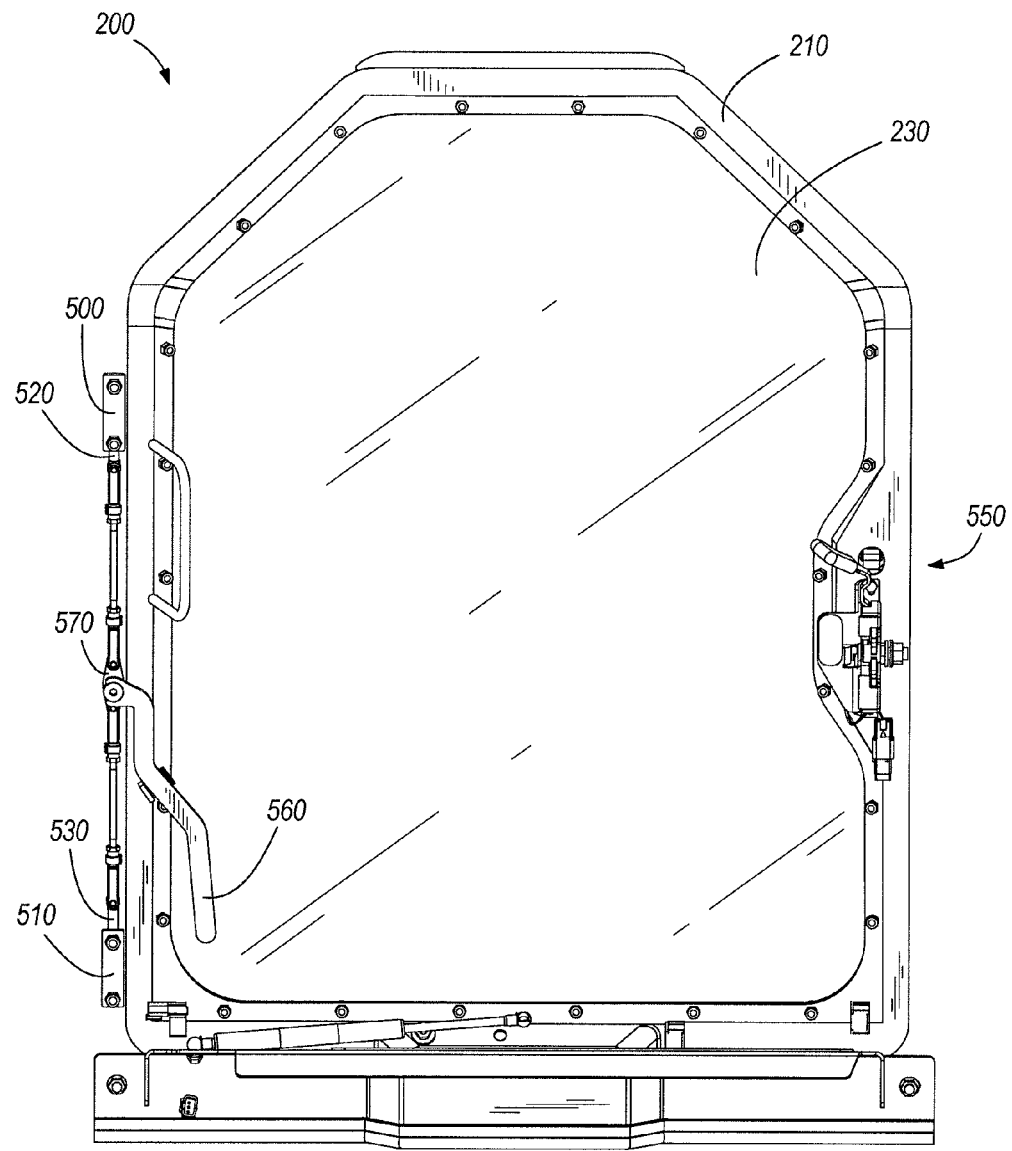
FIG. 5 is a front view of the door assembly in a locked position from inside the skid steer loader of FIG. 1
Figure 6:
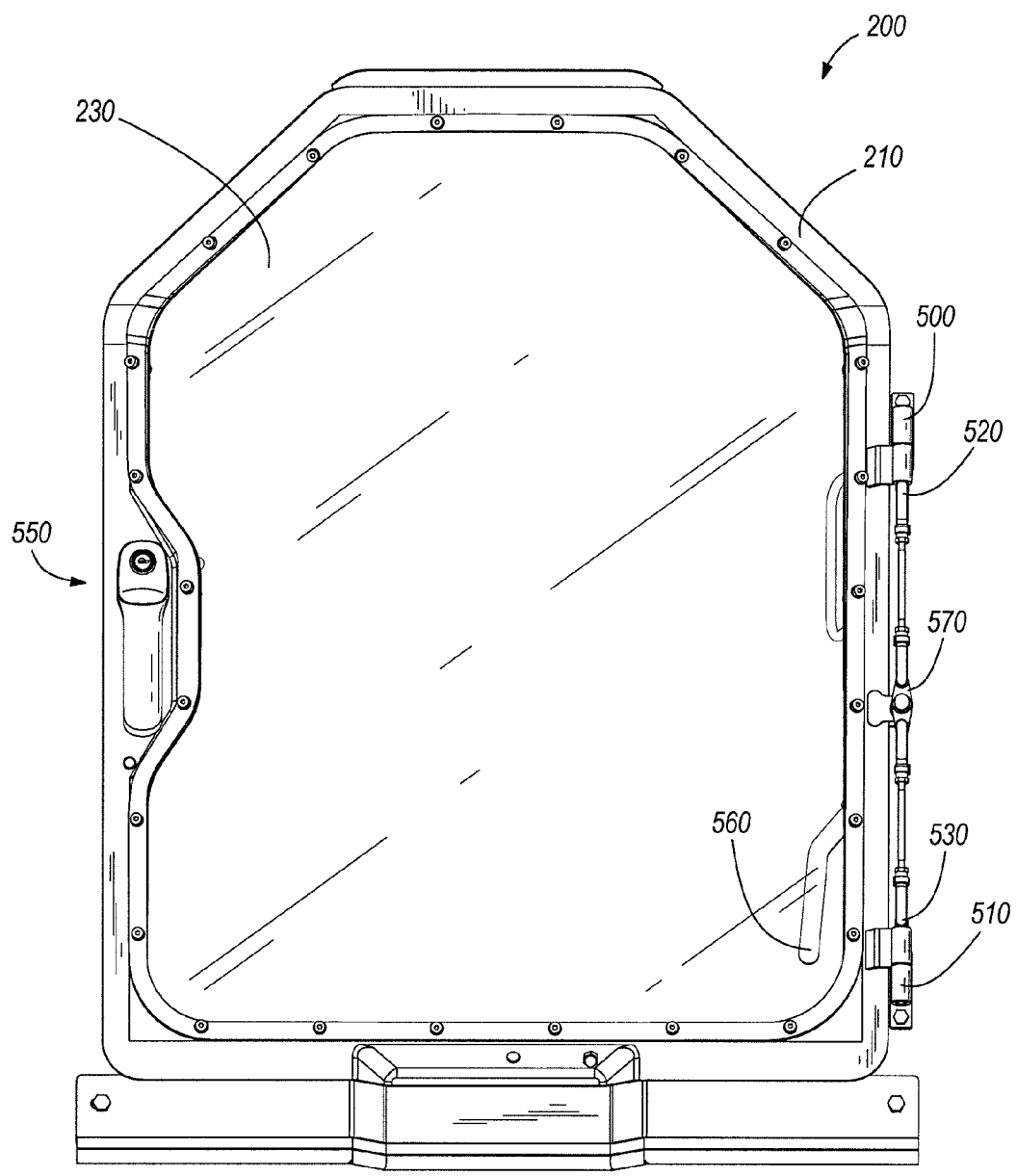
FIG. 6 is a front view of the door assembly from outside the skid steer loader of FIG. 1.

FIGS. 5 and 6 show the door assembly 200 including the door frame 210 and the windowpane 230 with the door assembly 200 in a locked position. FIG. 5 is the view from inside the operator compartment 35, whereas FIG. 6 is the view from outside of the operator compartment 35. The door assembly 200 further includes first and second hinges 500, 510, respectively, coupled to the door frame 210. First and second hinge pins 520, 530, respectively are coupled to the loader 10 and are inserted into the respective first and second hinges 500, 510 in the illustrated configuration. The hinge pins 520, 530 are rotatable within the hinges 500, 510 to allow the door assembly 200 to rotate with respect to the loader 10.

The door assembly 200 further includes a latching mechanism 550 on the opposite side of the door assembly 200 as the hinges 500, 510 and hinge pins 520, 530. When an operator desires to enter or exit the loader 10, the latching mechanism 550 can be actuated to allow the door assembly 200 to pivot at the hinges 500, 510 about hinge pins 520, 530.

In some circumstances, the door assembly 200 cannot pivot about the hinges 500, 510 and hinge pins 520, 530 due to lack of space, an object in the way of the door path or various other reasons. Also, in some emergency cases, it may be desirable to detach the door assembly 200 from the loader 10 to allow for quick egress from the operator compartment 35.

A lever 560 is provided on the interior of the operator compartment 35 for rotation relative to the door frame 210. The lever 560 is coupled to a cam member 570 for rotation with the cam member 570. The hinge pins 520, 530 are coupled to the cam member 570 for substantially linear movement into and out of the hinges 500, 510, in response to rotation of the lever 560 and cam member 570. The illustrated hinge pins 520, 530 and the cam member 570 are positioned on the exterior of the loader 10. Rotation of the lever 560 causes the door assembly 200 to detach from the loader 10, and thereby allow for egress from the loader 10 when the door assembly 200 cannot pivot about the hinges 500, 510.

Figure 7:
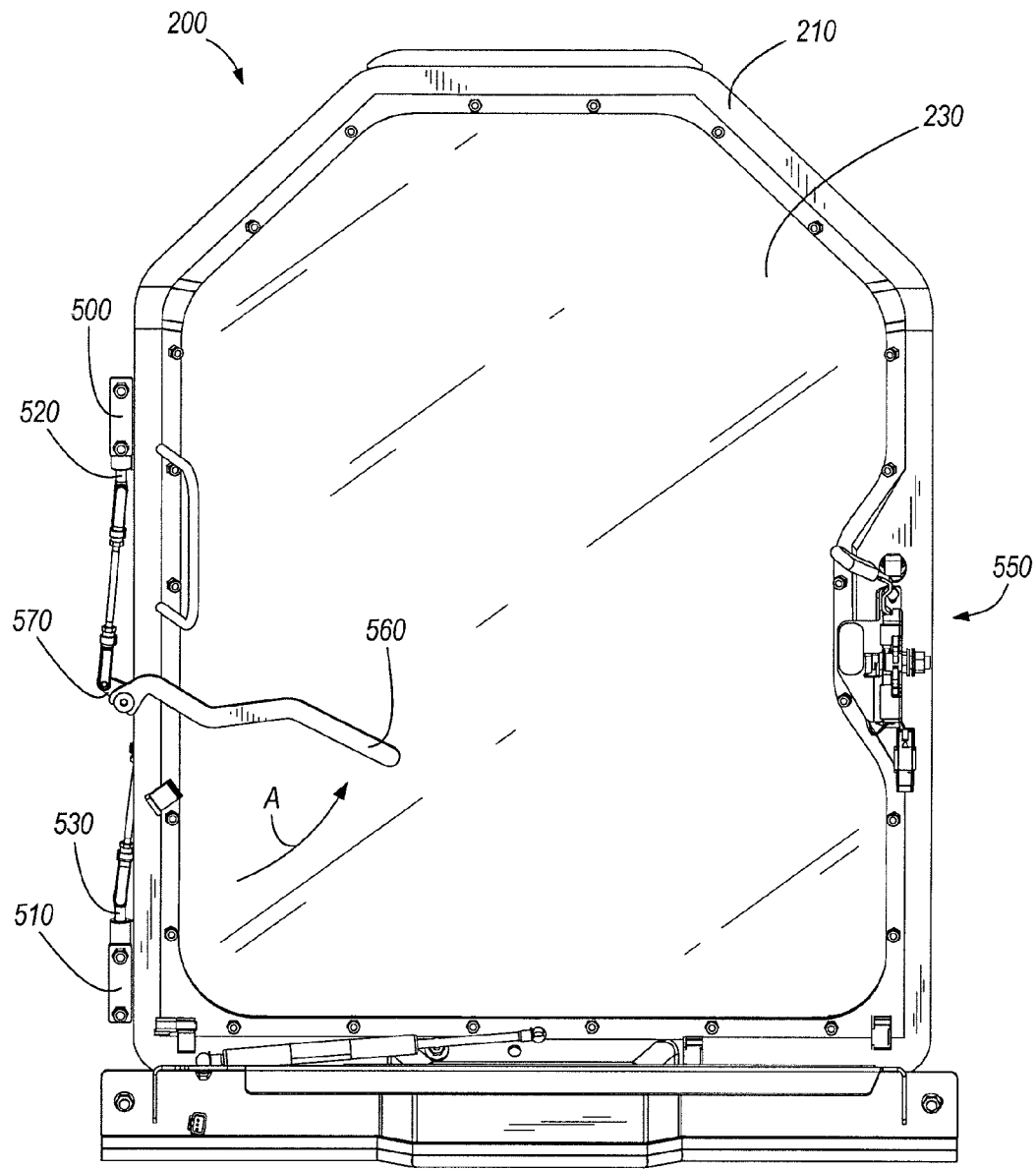
FIG. 7 is a front view of the door assembly in an unlocked position from inside the skid steer loader of FIG. 1.
Figure 8:
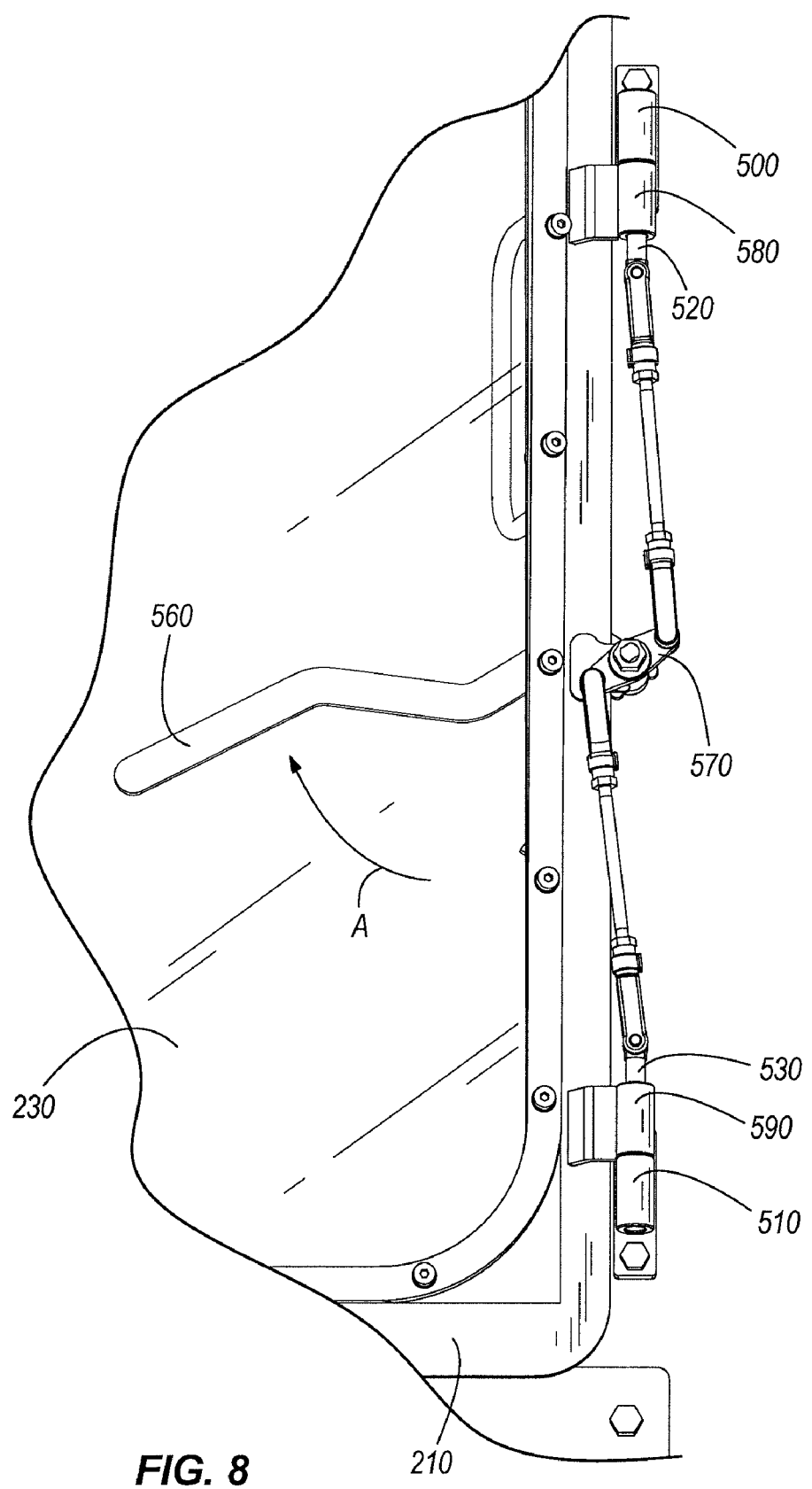
FIG. 8 is a partial side view of the door assembly of FIG. 7.

FIGS. 7 and 8 show the door assembly 200 with the lever 560 and cam member 570 pivoted along arrow A to an open position so that the hinge pins 520, 530 are withdrawn from hinges 500, 510. Therefore, the door assembly 200 can be detached from the loader 10 allowing quick egress of an operator, even if the door assembly 200 is blocked from pivoting about the hinges 500, 510. With the hinge pins 520, 530 withdrawn from the hinges 500, 510, the door assembly 210 is no longer coupled to the loader 10. Both of the hinges pins 520, 530 are simultaneously withdrawn from the respective hinges 500, 510 when the lever 560 is rotated about arrow A.

In the illustrated embodiment, the hinge pins 520, 530 are inserted into sleeves 580, 590 on the door assembly 200 prior to insertion into the hinges 500, 510 on the loader 10. Therefore, the hinge pins 520, 530 only need to be withdrawn from the hinges 500, 510 on the loader 10 and need not be withdrawn from the sleeves 580, 590 on the door assembly 200 as well. In other non-illustrated embodiments, no sleeves are utilized, so that the hinge pins 520, 530 are received into the respective hinges 500, 510 directly. In another embodiment, the hinges 500, 510 are positioned on the door assembly 200 and the hinge pins 520, 530 and sleeves 580, 590 are coupled to the loader 10.

The door assembly 200 is easily re-mounted to the loader 10 after being detached. In order to re-attach the door assembly 200 to the loader 10, the door assembly 200 is held in abutment with the loader 10 such that the hinge pins 520, 530 are adjacent the hinges 500, 510. The lever 560 is pivoted to insert the hinge pins 520, 530 into the respective hinges 500, 510.

The substantially linear movement of the hinge pins 520, 530 is shown more clearly in FIGS. 7 and 8 as being substantially vertical, but in another embodiment, depending on the orientation of the hinges, the movement is substantially horizontal, whereas in yet another embodiment, the movement is substantially diagonal, and in yet another embodiment, the hinge pin 520, 530 movement is substantially skew. Further, the cam member 570 is illustrated as being diamond-shaped, but other shapes, such as ovals, circles, rectangles, squares and so on are possible and are considered to be within the scope of the present invention.

Thus, the invention provides, among other things, a more secure method of mounting an impact resistant window to the door frame of a utility work vehicle than has been previously employed. The plurality of fastener assemblies 400 resist movement of the windowpane 230 in directions perpendicular to the longitudinal axes of the fastener assemblies 400. The resilient gasket 220 and resilient washers 260 substantially absorb forces causing deflection of the windowpane 230 in directions parallel to the longitudinal axes of the fastener assemblies 400. The fastener assemblies 400 support the windowpane in the absence of a rigid structural element, such as an external frame, extending along the outer surface 317 of the windowpane 230 between the plurality of fastener assemblies 400. The invention further provides a door assembly 200 with a lever 560 for detaching the door assembly 200 from the loader 10 to allow for egress from the loader 10 in case of emergency. Various features and advantages of the invention are set forth in the following claims.

What is claimed is:

1. A door assembly for a construction vehicle, the door assembly comprising:

a frame member having an inside surface and an outside surface and being releasably coupled to the vehicle, the frame member defining a window aperture having a perimeter;

a window pane positioned to overlie one of the inside surface and outside surface around the perimeter of the window aperture;

a first resilient member positioned between the frame member and the window pane around the perimeter of the window aperture, to substantially vibrationally isolate the and the window pane;

a plurality of fasteners each having a reduced diameter portion and a shoulder extending outwardly around the reduced diameter portion, portions of the fastener and the shoulder extending through the frame member, window pane, and the first resilient member with the reduced diameter portion extending through the frame member, with the shoulder seated on the frame member free of resilient material between the shoulder and the frame member, the fasteners being secured to the frame member, to couple the window pane to the frame member at a plurality of fastener locations adjacent the perimeter of the window aperture; and the fasteners each having an enlarged portion on a side of the window pane opposite from a side of the window pane facing the frame member, to retain the window pane against the first resilient member with the respective shoulders seated on the frame member to vibrationally isolate the window pane from the frame member, the fasteners forming the sole members supporting the window pane on the frame member.

2. The door assembly of claim 1, further characterized by a resilient washer between the enlarged portion of each fastener and the window pane, and wherein a stack height of the door assembly equals the sum of a thickness of the first resilient member, a distance from the inner surface of the windowpane to the resilient washers, and a thickness of the resilient washers; wherein the distance between the enlarged portions and the frame member is slightly smaller than the stack height in the door assembly, to slightly preload the first resilient member and the resilient washers.

3. The door assembly of claim 2, wherein the fasteners resist movement of the window pane in directions perpendicular to the longitudinal axis of the fasteners, and wherein the first resilient member and the resilient washers absorb forces causing deflection of the window pane in directions parallel to the longitudinal axis of the fasteners.

4. The door assembly of claim 1, further comprising a hinge having first and second portions each mounted to one of the frame member and the vehicle;
   a hinge pin pivotally mounted to the hinge for pivotally coupling the first and second hinge portions together to pivotally mount the frame member to the vehicle; and
   a lever coupled to the hinge pin for moving the hinge pin relative to the hinge portions upon movement of the lever to selectively decouple the first hinge portion from the second hinge portion and decouple the door assembly from the vehicle.

5. The door assembly of claim 4, wherein there are a plurality of hinges with first and second portions mounted to one of the frame member and the vehicle and each hinge having a hinge pin, the hinge pins being coupled to the lever.

6. The door assembly of claim 4, further comprising a cam member coupled to the hinge pin and the lever for rotation with the lever to move the hinge pin relative to the hinge portions of each hinge upon rotation of the lever.

7. The door assembly of claim 1, and second resilient members positioned between the enlarged portions of the fasteners and the window pane to substantially vibrationally isolate the window pane and the fasteners.

8. A door assembly for a construction vehicle, the door assembly comprising:
   a frame member defining a window aperture and a plurality of frame holes spaced around the window aperture;
   a gasket supported on the frame member and substantially surrounding the window aperture and defining a plurality of gasket holes substantially aligned with the frame holes, the gasket being constructed of a resilient material;
   a window pane positioned adjacent the gasket and defining a plurality of window holes substantially aligned with the gasket holes, the window pane substantially covering the window aperture;
   a plurality of washers on a side of the window pane opposite from the frame member and defining washer holes each substantially aligned with one window hole, the washers being constructed of a resilient material; and
   a separate fastener assembly extending through each of the substantially aligned frame holes, gasket holes, window holes, and washer holes, and having a reduced diameter portion extending through the aligned frame holes, each separate fastener assembly having a first enlarged portion abutting directly against a surface of the frame member and a second end opposite the first end, the second end defining a second enlarged portion, and abutting against the associated washer, the fastener assemblies being secured to the frame member and forming the sole support for the window pane relative to the frame member.

9. The door assembly of claim 8, wherein at least a portion of the second enlarged portion of the fastener assembly is recessed into the window.

10. The door assembly of claim 8, wherein a stack height of the fastener assembly in each frame hole equals the sum of a thickness of the gasket, a distance from the inner surface of the windowpane to the resilient washer, and a thickness of the washer, wherein the first enlarged portion of each fastener assembly comprises a shoulder having a diameter larger than the diameter of the frame hole, such that the shoulder abuts against the frame member around the respective frame hole free of intervening resilient material; and wherein abutment of the shoulder against the frame member fixes the distance between the second enlarged portion of each fastener assembly and the frame member to be slightly less than the stack height of the fastener assembly to slightly preload the gasket and resilient washer when the fastener assembly is secured to the frame member.

11. The door assembly of claim 8, wherein the fastener assemblies resist movement of the window pane in directions perpendicular to the longitudinal axis of the fastener assembly, and wherein the resilient gasket and resilient washers absorb forces causing deflection of the window pane in directions parallel to the longitudinal axis of the fastener assemblies.

12. The door assembly of claim 8 further comprising a lever coupled to the frame member and at least one hinge pin coupled to the lever for movement in response to movement of the lever, the hinge pin couplable to a hinge to movably couple the door assembly to the vehicle.

* * * * *